(12) United States Patent
S et al.

(10) Patent No.: US 10,713,962 B1
(45) Date of Patent: Jul. 14, 2020

(54) SYSTEMS AND METHODS FOR ALERTING IMPROPER INHIBITION OF WARNING SYSTEMS

(71) Applicant: Honeywell International Inc., Morris Plains, NJ (US)

(72) Inventors: Anoop S, Bangalore (IN); Sunitha Panchangam, Karnataka (IN); Nathan Krishnamoorthy, Bangalore (IN); Justin Schassler, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/274,974

(22) Filed: Feb. 13, 2019

(51) Int. Cl.
| | | |
|---|---|---|
| G01C 23/00 | (2006.01) | |
| G08G 5/04 | (2006.01) | |
| B64D 45/00 | (2006.01) | |
| G08G 5/00 | (2006.01) | |

(52) U.S. Cl.
CPC ............ *G08G 5/045* (2013.01); *B64D 45/00* (2013.01); *G08G 5/0026* (2013.01)

(58) Field of Classification Search
CPC .................................................... G08G 5/045
See application file for complete search history.

(56) References Cited

U.S. PATENT DOCUMENTS

| | | | | |
|---|---|---|---|---|
| 7,633,430 | B1 * | 12/2009 | Wichgers | G01S 7/04 342/65 |
| 2002/0116097 | A1 | 8/2002 | Block et al. | |
| 2011/0029162 | A1 | 2/2011 | Ishihara et al. | |
| 2011/0187562 | A1 * | 8/2011 | Botargues | G08G 5/045 340/970 |
| 2012/0116613 | A1 * | 5/2012 | Daumas | F02C 9/42 701/3 |
| 2012/0123671 | A1 * | 5/2012 | Oberti | G01S 13/94 701/301 |
| 2016/0318446 | A1 * | 11/2016 | Van Steenkist | B60Q 9/008 |

OTHER PUBLICATIONS

"ICAO Annex 2: Rules of the Air", International Civil Aviation Organization 10th Edition (Jul. 2005).

* cited by examiner

*Primary Examiner* — Joseph H Feild
*Assistant Examiner* — Pameshanand Mahase
(74) *Attorney, Agent, or Firm* — Bookoff McAndrews, PLLC

(57) ABSTRACT

Systems and methods and disclosed for alerting improper inhibition of alerts of aircraft warning systems. In some examples, a method may include: determining whether an inhibition of a safety alert of a warning system of an aircraft is activated; upon determining that the inhibition is activated, determining whether the inhibition is improper under current or upcoming operating conditions of the aircraft, the current or upcoming operating conditions including a current or projected position of the aircraft and a weather condition at the current or projected position; and upon determining that the inhibition is improper under the current or upcoming operating conditions, alerting an operator of the aircraft to deactivate the inhibition.

20 Claims, 4 Drawing Sheets

US 10,713,962 B1

SYSTEMS AND METHODS FOR ALERTING IMPROPER INHIBITION OF WARNING SYSTEMS

TECHNICAL FIELD

Various embodiments of the present disclosure relate generally to management of warning systems used by aircraft and, more particularly, to alerting improper inhibition of safety alerts of such warning systems.

BACKGROUND

Warning systems may be used on aircraft to issue alerts when the aircraft encounters conditions hazardous to safety. For example, a terrain awareness and warning system (TAWS) may be used to decrease the risk of controlled flight into terrain (CFIT) accidents by issuing alerts when a hazardous terrain situation is detected. Warning systems may be equipped with features that permit pilots to inhibit alerts. For example, a TAWS system may have a terrain inhibit switch that permits a pilot to inhibit TAWS alerts. Such a switch may be useful to avoid nuisance from alerts when deliberately operating near terrain.

Once an alert of a warning system has been inhibited, it may be appropriate for the pilot to un-inhibit the alert when flight conditions change, such as when the aircraft is flying into instrument meteorological conditions (IMC) from visual meteorological conditions (VMC). However, remembering to un-inhibit the alert may require the pilot to adequately monitor the situation and perform the action at the appropriate time. Pilots may forget to perform the action due to multitasking, distraction, task interruption, absence of cues, or other factors.

Therefore, there is a need for systems and methods for preventing alerts from warning systems from remaining inhibited if the pilot does not un-inhibit them when it is appropriate to do so. The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for alerting improper inhibition of alerts of aircraft warning systems, the method comprising.

For instance, a method may include: determining whether an inhibition of a safety alert of a warning system of an aircraft is activated; upon determining that the inhibition is activated, determining whether the inhibition is improper under current or upcoming operating conditions of the aircraft, the current or upcoming operating conditions including a current or projected position of the aircraft and a weather condition at the current or projected position; and upon determining that the inhibition is improper under the current or upcoming operating conditions, alerting an operator of the aircraft to deactivate the inhibition.

Furthermore, a computer system may include a memory storing instructions; and one or more processors configured to execute the instructions to perform operations. The operations may include: determining whether an inhibition of a safety alert of a warning system of an aircraft is activated; upon determining that the inhibition is activated, determining whether the inhibition is improper under current or upcoming operating conditions of the aircraft, the current or upcoming operating conditions including a current or projected position of the aircraft and a weather condition at the current or projected position; and upon determining that the inhibition is improper under the current or upcoming operating conditions, alerting an operator of the aircraft to deactivate the inhibition.

Furthermore, a non-transitory computer-readable medium storing instructions that, when executed by one or more processors, cause the one or more processors to perform a method for alerting improper inhibition of alerts of aircraft warning systems. The method may include: determining whether an inhibition of a safety alert of a warning system of an aircraft is activated; upon determining that the inhibition is activated, determining whether the inhibition is improper under current or upcoming operating conditions of the aircraft, the current or upcoming operating conditions including a current or projected position of the aircraft and a weather condition at the current or projected position; and upon determining that the inhibition is improper under the current or upcoming operating conditions, alerting an operator of the aircraft to deactivate the inhibition.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus.

In the following description, embodiments will be described with reference to the accompanying drawings. In various embodiments, a computer system may determine whether a safety alert has been inhibited. If the alert is inhibited, the computer system may determine whether inhibition of the alert is proper. For example, the inhibition of an alert may be improper if the weather conditions do not permit visual flight rules (VFR) flying. Therefore, to determine whether the inhibition of the alert is proper, the computer system may determine relevant weather conditions at a current or upcoming position of the aircraft, and determine whether those weather conditions permit VFR flying. If the inhibition of the alert is improper, then an alert indicating that the inhibition should be turned off may be issued to the pilot or flight crew. Accordingly, it is possible to prevent alerts from remaining inhibited in circumstances in which their inhibition would be improper.

Figure 1:
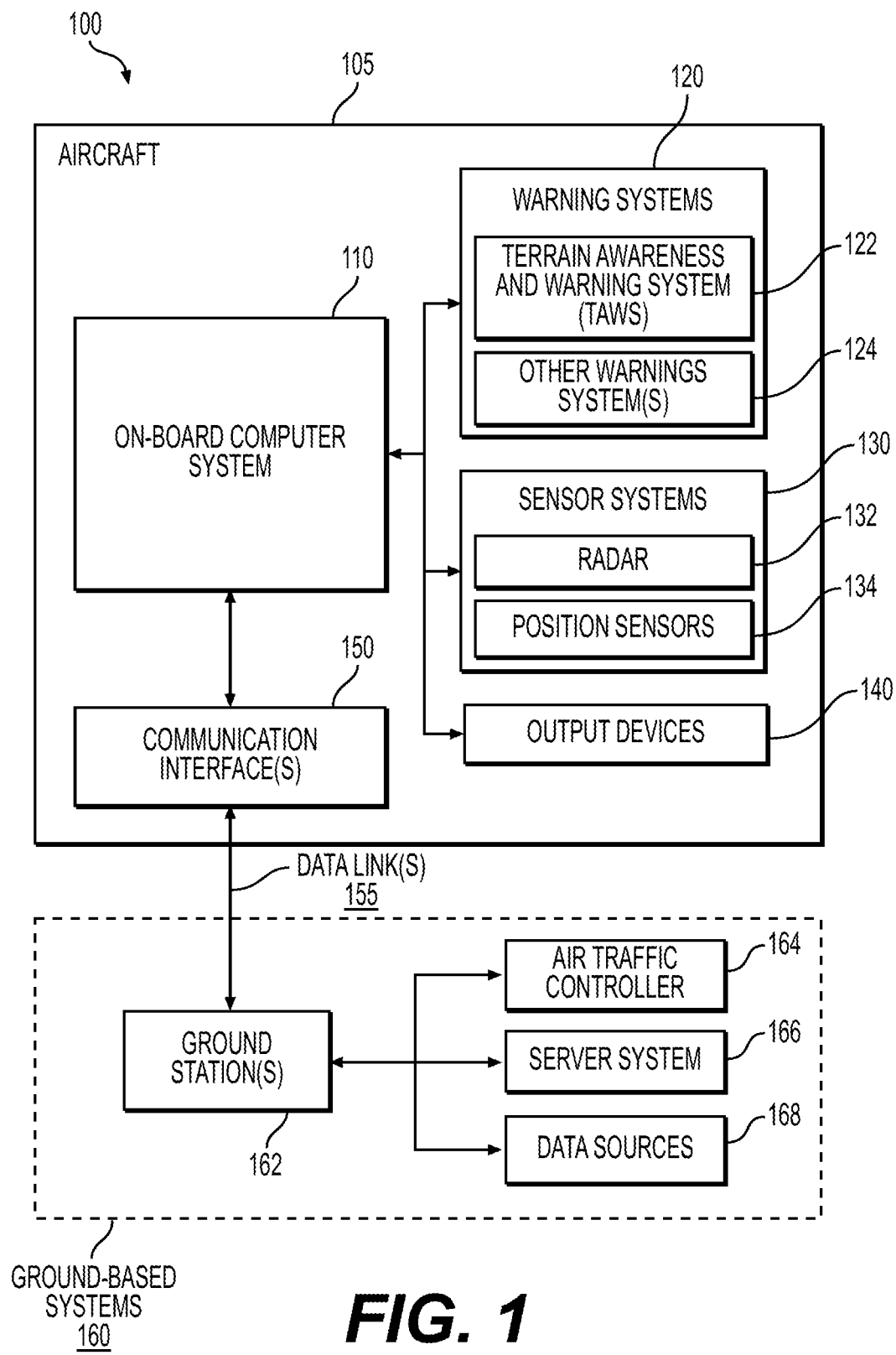
FIG. 1 is a diagram depicting an example of a system environment, according to one or more embodiments.

FIG. 1 illustrates a system environment 100 comprising an aircraft 105 connected to various ground systems 160. The aircraft may include various avionics and electronics systems, such as an on-board computer system 110, warning systems 120, sensor systems 130, output devices 140, and one or more communication interfaces 150.

The on-board computer system 110 may be, for example, a flight management system (FMS) of the aircraft 105 or a component of the flight management system. The computer system 110 may include a memory storing instructions and one or more processors configured to execute the instructions to perform various operations described in this disclosure. The memory may also store databases, such as terrain and navigation databases.

Warning systems 120 may include safety nets that issue safety alerts upon detection of a condition hazardous to safety, including safety nets that permit inhibition of their alerts. In general, the methods of this disclosure, including the method of FIG. 2 discussed below, may be applied to any safety net that has a configurable setting to inhibit alerts of that safety net. A safety net may also be referred to as a safety system.

For example, the warning systems 120 may include a terrain awareness and warning system (TAWS) 122 along with other warning systems 124. TAWS 122 may be, for example, a ground proximity warning system (GPWS) or an enhanced ground proximity warning system (EGPWS). Other warning systems 124 may include, for example, an airborne collision avoidance system (ACAS) such as a traffic collision avoidance system (TCAS).

Sensor systems 130 may include any sensor used by the aircraft 105. For example, the sensor systems 130 may include a radar 132 and position sensors 134. Position sensors 134 may include, for example, a global positioning system (GPS), an altimeter, or any other type of position sensor. Sensor systems 130 may provide various information used by the on-board computer system 110 or by the warning systems 120, such as aircraft position, speed, direction, and/or altitude. Radar 132 may include a weather radar configured to measure external weather conditions. In some examples, sensor systems 130 may include a transponder, which may be used by an ACAS for detection of other aircraft.

Any of the warning systems 120, such as TAWS 122, may be configured to issue a safety alert to an operator of aircraft 105 in response to detection of a hazardous situation. Detection of a hazardous situation may be based on readings from any one or more of the sensor systems 130 (e.g., aircraft position, speed, direction, and/or altitude) and/or other available information, such as a terrain database stored on the on-board computer system 110 or information provided by ground-based systems 160. The safety alert may be a cockpit safety alert that is presented in the cockpit in any medium (e.g., aural and/or visual), and may be of any type of safety net alert, such as warning alerts, time-critical warning alerts, master visual and aural alerts, caution alerts, and advisory alerts. The medium and/or content of the safety alert may depend on the particular circumstances triggering the alert. An operator of an aircraft may be a pilot or any member of the aircraft's flight crew.

Any of the warning systems, such as TAWS 122, may have a functionality of allowing the operator of the aircraft to set one or more alerts given by the warning system to an inhibited state. In some examples, such functionality may be implemented by a switch that may be switched on and off to respectively engage and disengage the inhibition of the alert. When an alert of a warning system is set to an inhibited state, that alert may be suppressed when it would otherwise be automatically presented to the operator of the aircraft.

The safety alert may be presented to the operator of the aircraft through output devices 140. Output devices 140 may include any combination of visual output devices, such as displays (e.g., display units) and audio output devices. The output devices 140 may be part of an electronic flight instrument system (EFIS).

For example, TAWS 122 may issue a safety alert upon detection of a hazardous condition, such as an excessive rate of descent, an excessive closure rate to terrain, a negative climb rate, or a loss of altitude after take-off. TAWS 122 may have a switch, sometimes referred to as a terrain inhibit switch, that allows the operator of the aircraft to suppress all visual and auditory warnings given by the system.

The one or more communication interfaces 150 may establish data links 155 to permit the aircraft 105 to transmit data to, and receive data from, any of the ground systems 160. Data links 155 may provide any suitable network connection (e.g., an internet connection) between the aircraft 105 and the ground systems 160. Ground systems 160 may include, for example, one or more ground stations 162, an air traffic controller 164, a server system 166, and data sources 168.

The one or more communication interface 150 may enable communications between the aircraft 105 and the ground systems 160 using any suitable communications technology, such as controller pilot data link communications (CPDLC), Wi-Fi, and satellite communications (SATCOM). The one or more communication interfaces 150 may include components such as transmitters, receivers, or transceivers for implementing such technologies. Any of the data links 155 may include a plurality of connected data links, such as a first link between the aircraft 105 and a satellite, and a second link between the satellite and one of the ground stations 162.

Any of the one or more ground stations 162 may be connected to a system of a communications service provider that enables the aircraft 105 to transmit data to, and/or receive data from, air traffic controller 164, server system 166, and data sources 168.

Server system 166 may be part of a data center that provides services to the aircraft 105. Server system 166 may be a computer system that includes a memory storing instructions and one or more processors configured to execute the instructions to perform various computer-implemented operations described in this disclosure. In some embodiments, server system 166 may operate a cloud server that performs such operations. Server system 166 may be in communication with air traffic controller 164 and data sources 168 through one or more communications networks.

Data sources 168 may include, for example, internet-accessible web servers and systems that provide subscribed services, such as weather forecasts transmitted via a satellite.

Figure 2:
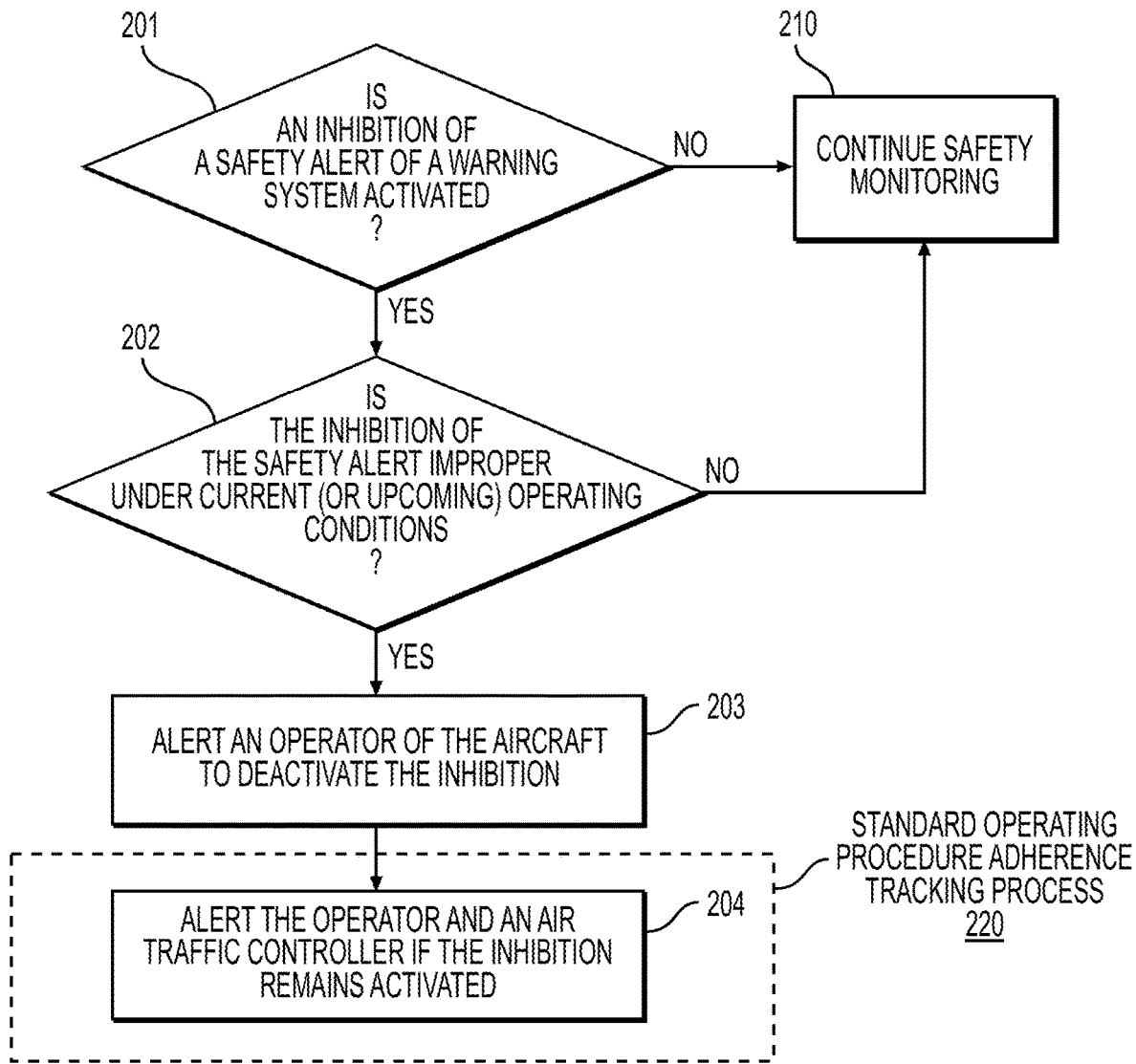
FIG. 2 is a flowchart depicting an example of a method for alerting improper inhibition of alerts of aircraft warning systems, according to one or more embodiments.

FIG. 2 illustrates a method for alerting improper inhibition of alerts of aircraft warning systems. The method may be a computer-implemented method performed by any suitable computer system. In some examples, the computer system performing the method may be on-board computer system 110, in which case any data that is gathered or possessed by one or more of the ground systems 160 may be provided to the on-board computer system 110 through data links 155. Alternatively or additionally, the computer system performing the method may be server system 166, in which case any data that is gathered or possessed by the aircraft 105 may be provided to the sever system 166 through data links 155. Furthermore, it is also possible for various operations of the method of FIG. 2 to be divided between the on-board computer system 110 and the server system 166. Any system that includes a computer system performing the method of FIG. 2 may also be referred to as a safety management system (SMS).

Step 201 may include determining whether an inhibition of a safety alert of a warning system is activated. In this disclosure, an "activated" state may also be referred to as an "engaged" or "on" state. The warning system may be any one of the warning systems 120 of aircraft 105 described above, such as TAWS 122 or an ACAS. As described above, the safety alert may be an alert that is presented through any medium (e.g., aural and/or visual), and may be of any type of safety net alert, such as a warning alert, a time-critical warning alert, a master visual or aural alert, a caution alerts, or an advisory alert.

In order detect whether the safety alert has been inhibited, the on-board computer system 110 may read an inhibition status of the warning system indicating whether inhibition of the safety alert is in an activated state. In some examples, the inhibition status may be determined based on a bus signal transmitted through a bus connecting between the on-board computer system 110 and the warning system. If step 201 is performed by server system 166, the server system 166 may obtain the inhibition status from on-board computer system 110.

If the safety alert is inhibited (201: YES), step 202 may include determining whether the inhibition of the safety alert is improper based on current or upcoming operating conditions of the aircraft. Such operating conditions may include position and movement parameters of the aircraft (e.g., position, altitude, speed, and direction of travel of the aircraft), parameters describing characteristics of the aircraft (e.g., aircraft type), parameters describing characteristics of the environment in which the aircraft is travelling (e.g., weather conditions, nearby terrain, or other hazards) and parameters dependent on both the aircraft and the environment, such as a distance from terrain. Characteristics of the environment conditions may also include airspace characteristics, such as a type of airspace in which the aircraft is operating or is to operate.

Whether inhibition of the safety alert is improper or not may be based on national or regional regulations and/or standard operating procedures used in aviation for the pertinent operating conditions. Such regulations or standard operating procedure may be represented as one or more computer-evaluable conditions under which inhibition of the safety alert is improper or is permitted according to the regulations or standard operation procedures. Such conditions may include requirements for certain operating conditions of the aircraft. Such conditions may be stored in or received by the computer system performing step 202, and may be evaluated by the computer system to determine whether inhibition of the safety alert is improper. In the context of whether the inhibition of an alert is improper, "permitted" is interchangeable with "not improper."

In some examples, whether inhibition of the safety alert is improper or not may be based on whether visual meteorological conditions (VMC) or instrument meteorological conditions (IMC) apply to the current or upcoming operating conditions. In such examples, the computer system performing step 202 may determine that the inhibition is improper if the current and/or upcoming operating conditions are not within visual meteorological conditions. Such a determination may be based on satisfaction of an applicable VMC minima, as discussed below in more detail in relation to FIG. 3.

An upcoming operating condition may be an operating condition at a position on an upcoming segment of the aircraft's planned flight path, or an operating condition at a position to which the aircraft is expected to travel based on the aircraft's trajectory or current direction of direction. In this disclosure, both types of positions may be referred to as a projected position of the aircraft.

The computer system performing the method of FIG. 2 may be capable of performing the method for both current operating conditions and upcoming operating conditions. In some examples, the operator of the aircraft or other user may specify whether the method of FIG. 2 is to evaluate the current operating conditions, the upcoming operating conditions, or both the current and upcoming operating conditions. If both current and upcoming operating conditions are to be evaluated, then the step 202 may result in a determination of "YES" if the inhibition of the safety alert is improper for either the current or the upcoming operating conditions.

If the inhibition is determined to be improper (202: YES), step 203 may include alerting the operator of the aircraft to deactivate the inhibition, such as by switching the inhibition to an "off" state. The switching off of an inhibition of an alert may also be referred to as a switching on of the alert. Step 203 may include outputting, through any of the output devices 140, a visual and/or aural alert indicating that inhibition of the safety alert is improper. Output devices 140 may be controlled by the on-board computer system 110 or controlled remotely by server system 166 to output the alert.

In some examples, the characteristics of the alert issued in step 203 may depend on whether the impropriety of the inhibition is under the current operating conditions or upcoming operating conditions. If the impropriety of the inhibition is under the upcoming operating conditions, the warning or alert issued to the operator of the aircraft may be a forecasted annunciation indicating, for example, that the crew should deactivate the inhibition when the aircraft enters into an operating condition under which the inhibition is improper, such as when entering instrument metrological conditions (IMC) or an airspace that does not permit instrument flight rule (IFR) flight.

Step 204 may include alerting the air traffic controller (ATC) (such as ATC 174 of FIG. 1) and the operator of the aircraft if the inhibition remains activated. For example, step 204 may include transmitting a notification to the ATC indicating that the operator of the aircraft has failed to take corrective action in turning off the inhibition when doing so is the appropriate course of action. The computer system performing step 204 may transmit such a notification upon determining that a predetermined length of time has elapsed after the inhibition switch was determined to be the proper course of action and the aircraft has not yet turned off the inhibition. The inhibition status may be determined based on a bus signal transmitted through a bus connecting between the on-board computer system 110 and the warning system.

The alert to the operator of the aircraft may be aural and/or visual, and may be an additional alert that is issued subsequent to any alert issued in step 203. The alert to the operation of the aircraft may be presented upon determining that the aforementioned predetermined length of time has elapsed. Output devices 140 may be controlled by the on-board computer system 110 or controlled remotely by server system 166 to output the alert to the operator of the aircraft.

As shown in FIG. 2, step 204 may be part of a standard operating procedure adherence tracking process 220, which may include additional steps besides step 204. The tracking process 220 may be performed by the same computer system that performs the method of FIG. 2, and may include, for example: (a) determining a weather condition at a current or projected position of the aircraft and/or any other relevant operating condition described above (e.g., steps 301 and 303 as described above); (b) determining that an inhibition of a safety alert of a warning system is improper if VFR flight is not permitted; (c) determining that the inhibition should be turned off (e.g., turned off within a predetermined length of time) because VFR flight is not permitted under the current or upcoming operating conditions (e.g., step 202: YES); (d) determining whether the operator of the aircraft has turned off the inhibition of the safety alert after elapse of the predetermined length; (e) alerting the operator of the aircraft and ATC upon determining that the operator of the aircraft has not turned off the inhibition of the safety alert after elapse of a predetermined length of time (e.g., step 204 described above); and (f) transmitting, to the ATC, a notification indicating that the inhibition has been turned off upon determining that the inhibition has been turned off, as described above.

The method of FIG. 2 may be part of a continuous safety monitoring process. If step 201 or step 202 resolves in "NO," the computer system performing the method may continue the safety monitoring process (step 210), during which step 201 is continuously evaluated.

Figure 3:
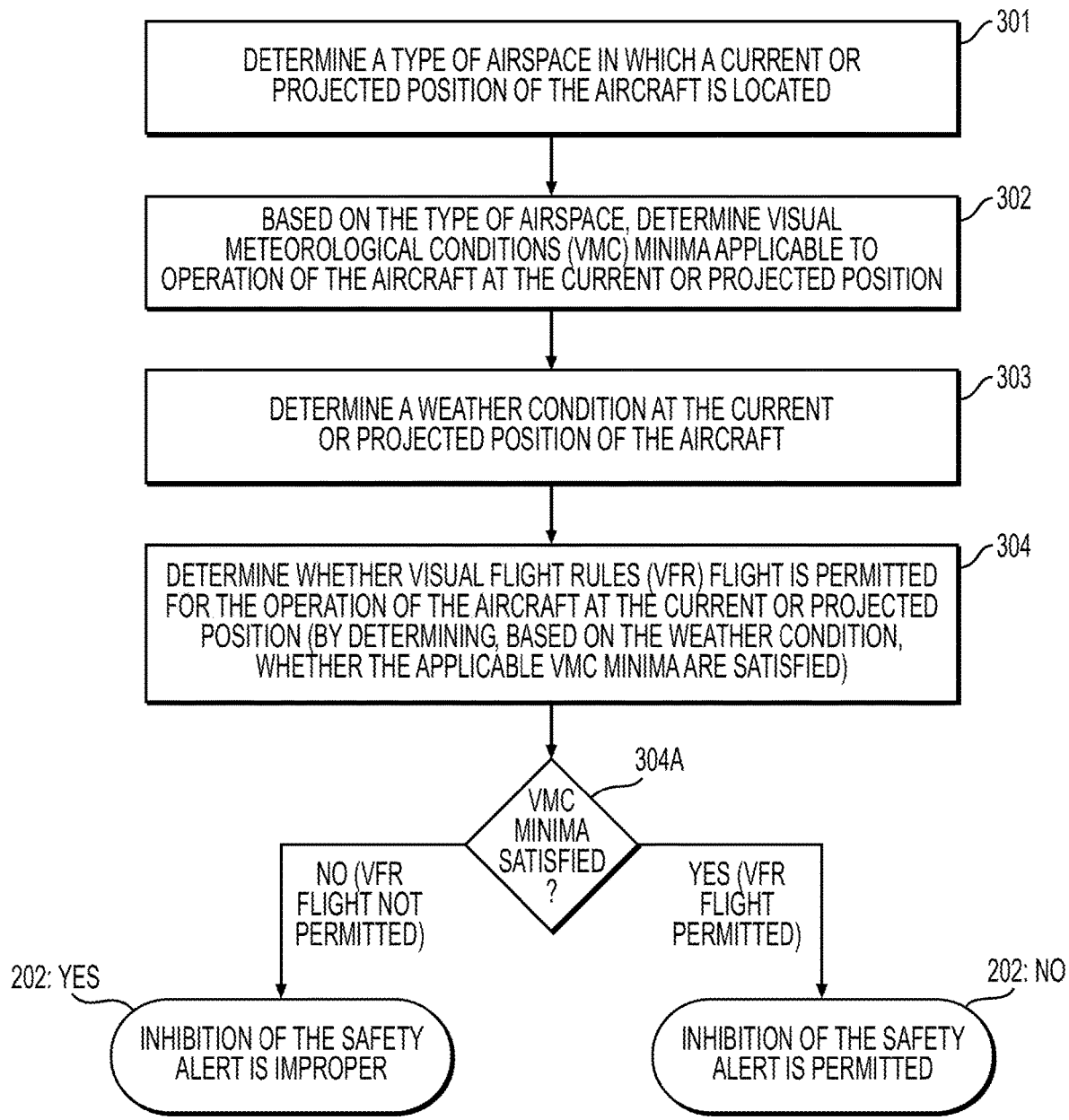
FIG. 3 is a flowchart depicting an example of a method for determining whether the inhibition of the safety alert is improper, according to one or more embodiments.

FIG. 3 illustrates an example of a method for determining whether the inhibition of the safety alert is improper under current or upcoming operating conditions. The steps in FIG. 3 may be understood as exemplary sub-steps of step 202 of FIG. 2.

Step 301 may include determining a type of airspace in which a current or projected position of the aircraft is located. In this context, a position may specify one or more position variables, such as longitude, latitude, and/or altitude. The current position of the aircraft may be obtained through position sensors 134. The projected position of the aircraft may be a position on an upcoming segment of the aircraft's flight path or a position to which the aircraft is expected to travel based on the aircraft's trajectory or current direction of direction. In some examples, the projected position may be determined based on the current position of the aircraft.

In the context of step 301, a type of airspace may be an airspace class (or other airspace classification or categorization) that is associated with certain regulations or standard operating procedures for flights in airspaces of that type. For example, flight regulations may specify whether VFR visual flight rules (VFR) flight is permitted for aircraft operating in the airspace and, if VFR flight is so permitted, the visual meteorological conditions (VMC) minima applicable to the airspace type.

Determination of airspace type may utilize airspace data describing airspace characteristics of a country or region in which the aircraft is flying. In some examples, the airspace data may define boundaries of various airspaces and may associate the various airspaces with an airspace type. In such examples utilizing airspace data, determination of airspace type may include determining an airspace in which the current or projected position of the aircraft is located by comparing the current or projected position with the boundaries of various airspaces spaces in the airspace data, and then determining the type (e.g., class) of that airspace in which the current or projected position is located using the airspace data.

In some examples, the computer system performing step 301 may query a database, such as a database storing the airspace data described above, that allows airspace class to be determined based on position. In some examples, the database used for airspace determination may be locally stored on the computer system performing step 301. Additionally or alternatively, the database may be stored in a remote data source (e.g., one of the data sources 168) accessible through a network such as the Internet. In such examples, the mode of access to the Internet to acquire the airspace data may vary depending on where the computer system performing step 301 is located. If the computer system is on-board computer system 110, then the connection to the Internet may be, for example, through SATCOM.

An airspace in which the current position of the aircraft is located may be referred to as the current airspace in which the aircraft is currently operating. An airspace in which the projected position of the aircraft is located may be referred to as an upcoming airspace into which the aircraft is flying. In some situations, the upcoming airspace may be different from the current airspace, and the inhibition of the alert may be permitted in the current airspace, but improper in the upcoming airspace. As described above in relation to step 203, the operator of the aircraft may be notified of such a situation.

Step 302 may include determining visual meteorological conditions (VMC) minima applicable to operation of the aircraft at the current or projected position. The determination of the VMC minima may be based on parameters such as the airspace class determined in step 301 and the altitude band in which the current or projected position of the aircraft is located.

Visual meteorological conditions (VMC) are conditions under which VFR flight is permitted in a certain airspace. The boundary criteria between VMC and instrumental meteorological conditions (IMC) are given by VMC minima, which may be defined by parameters that may include as one or more visibility parameters (e.g., flight visibility, and whether or not the surface is in sight) and one or more cloud distance parameters (e.g., vertical cloud distance, horizontal cloud distance, and whether or not there is clearance of clouds). These parameters may vary depending on the region or country.

For example, the International Civil Aviation Organization (ICAO) has adopted a set of classifications for airspace, comprising classes A through G. Each class of airspace is associated with VMC minima defined in terms of parameter such as minimum visibility and minimum distance from clouds. That is, a minimum visibility and a minimum distance from clouds is specified for various combinations of airspace class and altitude band.

Table 1 below provides an example of VMC minima corresponding to different combinations of airspace class and altitude band, as specified by the ICAO Annex 2: Rules of the Air, 10th Edition (2005).

TABLE 1

ICAO VMC Minima

| Airspace Class | Altitude Band | Applicable VMC Minima | |
| --- | --- | --- | --- |
| | | Minimum Flight Visibility | Minimum Distance from clouds |
| A | | VFR not permitted | VFR not permitted |
| B, C, D, E, F, and G | At and above 10,000 feet AMSL | 8 km | 1500 m horizontally, 1000 feet vertically |
| B, C, D, E, F, and G | Below 10,000 feet AMSL and above whichever is the higher of 3000 feet AMSL and 1000 feet above terrain | 5 km | Same as above |
| B, C, D, E, F, and G | At and below whichever is the higher of 3000 feet AMSL and 1000 feet above terrain | 5 km | Same as above |
| F and G | At and below whichever is the higher of 3000 feet AMSL and 1000 feet above terrain | 5 km (or lower, when permitted by the appropriate authority) | Clear of cloud and with the surface in sight |

For example, if an aircraft is flying in a class C airspace, and is at an altitude of 15,000 feet above mean sea level (AMSL), the aircraft may fly under VFR if the flight visibility is 8 km or greater, and the distance from clouds is 1500 m or greater horizontally and 1000 feet or greater vertically. If the flight visibility is only 5 km, then VFR flight is not permitted under the rules specified in the above table.

In general, the VMC minima that is applicable to an aircraft may depend on parameters such as the class of the airspace in which the aircraft is traveling and the altitude band in which the aircraft is traveling (which may be defined by parameter such as above mean sea level (AMSL) and distance above terrain). Depending on the region or country, the VMC minima may also depend on other factors, such as the time of day (e.g., daytime or nighttime), the type of aircraft (e.g., airplane or helicopter), and/or the speed of the aircraft.

The above table is provided to illustrate that different combinations of airspace class and altitude bands may have different respective VMC minima. As noted above, national aviation authorities may differ in their specific implementations of the ICAO airspace classes. For example, in the United States, class F is not used, and the cloud condition for class B is "clear of clouds" rather than the distances specified in Table 1. Furthermore, in the United States, the VMC minima for category G vary according to whether the time is daytime or nighttime.

The determination of the VMC minima in step 302 may be based on any of the parameters described above, such as the airspace class and the altitude band. In some examples, data specifying the correspondence between the applicable VMC minima and parameters used to determine the VMC minima (e.g., airspace class and altitude band) may be stored in on-board computer system 110, server system 166, and/or data sources 168. Such data may be, for example, in the form of a database having a table in the manner shown in Table 1. Accordingly, the applicable VMC minima may be determined as a function of the aforementioned parameters.

In general, the computer system performing step 302 may be configured to determine any parameter used to determine the applicable VMC minima, including the parameters described above. Furthermore, the computer system performing the method of FIG. 3 may be configured to account for differences among national or regional regulations in the parameters used to determine VMC minima, such as by selecting a proper set of parameters for determining the VMC minima based on the applicable country or region. The values of parameters used to determine VMC minima may be determined based on any suitable method, including the use of any component shown in system environment 100 of FIG. 1. For example, the airspace class may be determined as described above for step 301. The altitude band may be determined based on, for example, readings of the position sensors 134.

Step 303 may include determining a weather condition at the current or projected position of the aircraft. Since VMC minima may be defined by flight visibility and cloud distances, the weather condition may include flight visibility condition and cloud conditions. Cloud conditions may indicate cloud ceilings and/or the position of clouds.

Weather conditions may be determined by accessing a data source that provides weather data. Examples of data sources include an on-board weather radar (e.g., radar 132 of FIG. 2), a ground radar, satellite data services (e.g., Sirius XM Aviation), ground-based servers (such as data centers and cloud servers), automatic dependent surveillance-broadcast (ADS-B) (e.g., flight information services-broadcast (FIS-B)), and various graphical weather uplinks. If step 303 is performed by on-board computer system 110, data that is provided by a ground-based data source (e.g., data sources 168) may be provided to the aircraft 105 through one or more data links 155.

A weather condition at a current or projected position of the aircraft may be a generally applicable or generally relevant weather condition that is not necessarily specific to a particular point in time or a particular position of the aircraft. For example, if the aircraft position is a projected position of the aircraft at a future point in time, the weather condition may be a current weather condition detected by the aircraft's radar (e.g., radar 132), if such condition is applicable or relevant to the future point in time. However, it is also possible for the weather condition to be a predicted weather condition for a future point in time. Likewise, the weather condition may be for a region, and need not be specific to the current or projected position of the aircraft. That is, a weather condition at a current or projected position of the aircraft may be a weather condition of a region in which such position is located. The specificity of weather data that is required may depend on the circumstances and the particularities of the implementation.

For example, a data source such as a satellite data service may provide METAR reports indicating current visibility and cloud conditions at a certain airport at a frequency of 20 minutes. The visibility and cloud conditions (e.g., clearance of clouds below a certain altitude) reported in a METAR may be applicable or relevant to any position within a certain distance from airport and for the period of time until issuance of the next METAR.

Step 304 may include determining whether visual flight rules (VFR) flight is permitted at the current or projected position. This determination may be performed by determining, based on the weather condition, whether the applicable VMC minima are satisfied for operation of the aircraft at the current or projected position.

As described above, the applicable VMC minima may be defined in terms of parameters (e.g., one or more visibility parameters and one or more cloud distance parameters, as described above) and a required value or a range of values (e.g., a flight visibility equal to or greater than a certain value) for each of the parameters. Each combination of a parameter and the respective value or range of values that is required for that parameter may be represented as a computer-evaluable condition. To determine whether the applicable VMC minima is satisfied, the computer system performing the determination process may determine whether each condition is satisfied by the weather condition determined in step 302.

If each condition is satisfied, then the computer system may determine that the applicable VMC minima are satisfied, indicating that VFR flight is permitted (304A: YES). In this case, the inhibition of the safety alert may be determined to be permitted (202: NO).

If at least one of the relevant conditions is not satisfied, then the applicable VMC minima is determined as not satisfied, indicating that VFR flight is not permitted (304A: NO). In this case, the inhibition of the safety alert may be determined to be improper (202: YES).

For example, if the applicable VMC minima includes the conditions of: (1) a visibility 8 km; (2) a horizontal cloud distance 1500 m; and (3) a vertical cloud distance 1000 feet, then the weather condition determined in step 302 may be used to evaluate whether each of these three conditions is satisfied at the pertinent aircraft position. As noted above, the weather condition determined in step 302 may include a visibility condition and a cloud condition. For example, a METAR may indicate that a region in which the aircraft is flying has a visibility of 7 miles (11.26 km), and the radar 132 of the aircraft 105 may indicate a horizontal cloud distance of 2000 m and a vertical cloud distance of 2000 feet. Since condition (1) is not satisfied, the VMC minima is not satisfied. Accordingly, it is determined that the inhibition of the safety alert is improper. Therefore, in accordance with step 203, the aircraft 105 may alert the operator of the aircraft to switch off the inhibition of the safety alert, so that the safety alert is not suppressed.

If the determination of whether inhibition of the safety is improper is performed for upcoming operating conditions of the aircraft, the method of FIG. 3 may be performed for a set of positions that include a plurality of projected positions, such as a plurality of positions on an upcoming segment of the flight path that have different respective distances from the current position of the aircraft. If the determination is performed for both the current and operating conditions of the aircraft, then the aforementioned set of positions may also include the current position of the aircraft.

According to various technical features described in this disclosure, it is possible to realize a safety management system (SMS) configured to alert a flight crew and/or ATC if a particular aircraft is flying with inhibited alerts when the conditions faced by the aircraft warrants the inhibition of a particular alert to be switched off so that the particular alert is not suppressed. As a result of the alerts, the technical features described in this disclosure may ensure greater safety of flights. For example, the risk of CFIT accidents may be decreased when a flight crew and/or ATC is able to receive alerts indicating an improper alert inhibition. Furthermore, since these technical features are part of aircraft avionics systems or systems that interact with or include aircraft avionics, they improve the technology of such systems.

In general, any process discussed in this disclosure that is understood to be computer-implementable, such as the processes illustrated in FIGS. 2-3, may be performed by one or more processors of a computer system, such as computer system 110 and/or server system 166, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110 and server system 166, may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 4:
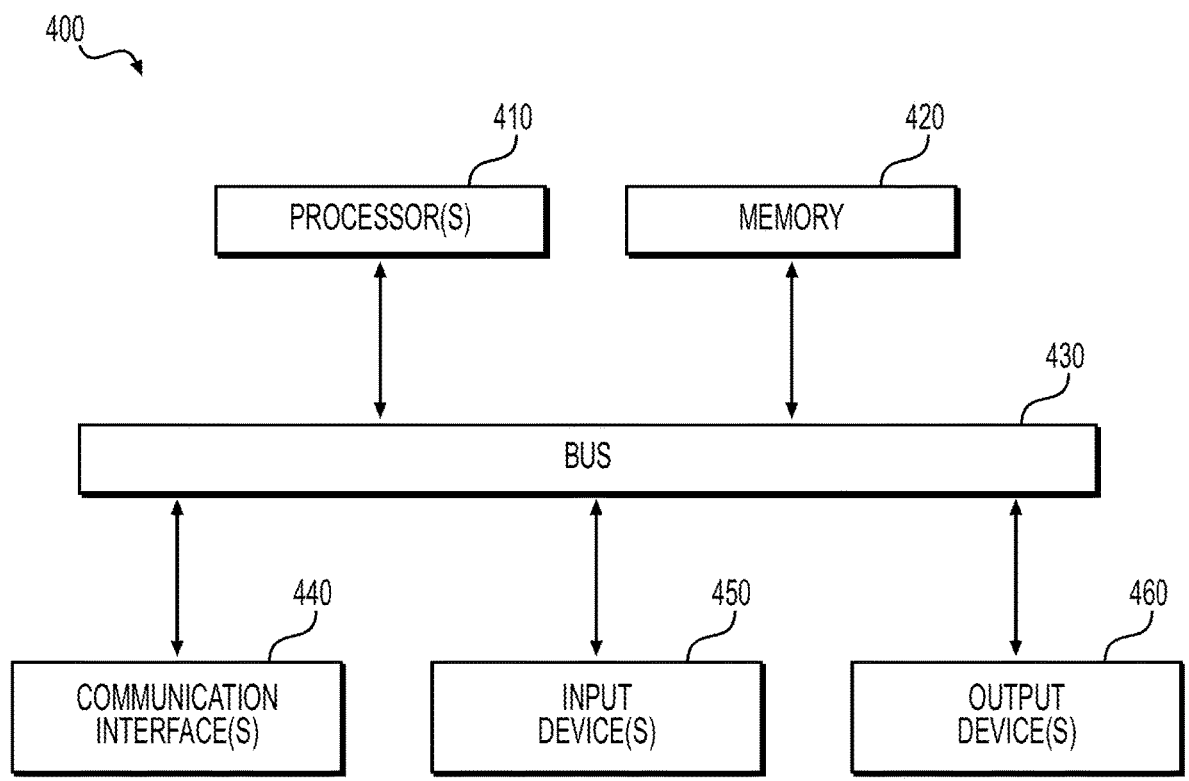
FIG. 4 depicts an example of a computer system, according to one or more embodiments.

FIG. 4 illustrates an example of a computing device 400 of a computer system. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 include both a CPU and a GPU.

In some implementations, communication interfaces 440, input devices 450, output devices 460 of FIG. 4 may respectively correspond to communication interface(s) 150, sensor systems 130, and output devices 140 of FIG. 1. While these components of FIG. 1, as well as warning systems 120, are illustrated in FIG. 1 as separate from on-board computer system 110, they may also be considered to be part of on-board computer system.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A method for alerting improper inhibition of alerts of aircraft warning systems, the method comprising:
   determining whether an inhibition of a safety alert of a warning system of an aircraft is activated;
   upon determining that the inhibition is activated, determining whether the inhibition is improper under current or upcoming operating conditions of the aircraft, the current or upcoming operating conditions including a current or projected position of the aircraft and a weather condition at the current or projected position;
   upon determining that the inhibition is improper under the current or upcoming operating conditions, alerting an operator of the aircraft to deactivate the inhibition;
   determining whether a deactivation of the inhibition from the operator of the aircraft is received, via interaction with one or more controls of the aircraft; and
   in accordance with a determination that a deactivation of the inhibition from the operator of the aircraft has not been received, after a predetermined time period transmitting an alert to an air traffic controller that the inhibition is improper and that inhibition has not been deactivated by the operator of the aircraft.

2. The method of claim 1, wherein the determining whether the inhibition is improper under current or upcoming operating conditions includes:
   determining a type of airspace in which the current or projected position is located;
   based on the determined type of airspace, determining visual meteorological conditions (VMC) minima applicable to an operation of the aircraft at the current or projected position;
   determining the weather condition at the current or projected position of the aircraft; and
   determining whether visual flight rules (VFR) flight is permitted for the operation of the aircraft at the current or projected position based on the determined VMC minima.

3. The method of claim 2, wherein the weather condition includes a flight visibility condition and cloud conditions for the current or projected position.

4. The method of claim 3, wherein the determining whether visual flight rules (VFR) flight is permitted for the operation of the aircraft at the current or projected position includes:
   determining whether the flight visibility condition and the cloud conditions satisfy the determined VMC minima.

5. The method of claim 2, wherein
   the type of airspace is a class of airspace, and
   the determining the applicable VMC minima includes determining the applicable VMC minima as a function of airspace class and an altitude band in which the current or projected position is located.

6. The method of claim 1, wherein the warning system is a terrain awareness and warning system (TAWS) or a traffic collision avoidance system (TCAS).

7. The method of claim 1, further comprising:
   determining that the inhibition has remained on after elapse of a predetermined length of time; and
   alerting that operator of the aircraft and an air traffic condition to indicate that the inhibition has not been turned off.

8. A computer system for alerting improper inhibition of alerts of aircraft warning systems, the computer system comprising
   a memory storing instructions; and
   one or more processors configured to execute the instructions to perform operations including:
      determining whether an inhibition of a safety alert of a warning system of an aircraft is activated;

upon determining that the inhibition is activated, determining whether the inhibition is improper under current or upcoming operating conditions of the aircraft, the current or upcoming operating conditions including a current or projected position of the aircraft and a weather condition at the current or projected position;

upon determining that the inhibition is improper under the current or upcoming operating conditions, alerting an operator of the aircraft to deactivate the inhibition;

determining whether a deactivation of the inhibition from the operator of the aircraft is received, via interaction with one or more controls of the aircraft; and in accordance with a determination that a deactivation of the inhibition from the operator of the aircraft has not been received, after a predetermined time period transmitting an alert to an air traffic controller that the inhibition is improper and that inhibition has not been deactivated by the operator of the aircraft.

9. The computer system of claim 8, wherein the determining whether the inhibition is improper under current or upcoming operating conditions includes:

determining a type of airspace in which the current or projected position is located;

based on the determined type of airspace, determining visual meteorological conditions (VMC) minima applicable to an operation of the aircraft at the current or projected position;

determining the weather condition at the current or projected position of the aircraft; and determining whether visual flight rules (VFR) flight is permitted for the operation of the aircraft at the current or projected position based on the determined VMC minima.

10. The computer system of claim 9, wherein the weather condition includes a flight visibility condition and cloud conditions for the current or projected position.

11. The computer system of claim 10, wherein the determining whether visual flight rules (VFR) flight is permitted for the operation of the aircraft at the current or projected position includes:

determining whether the flight visibility condition and the cloud conditions satisfy the determined VMC minima.

12. The computer system of claim 9, wherein the type of airspace is a class of airspace, and the determining the applicable VMC minima includes determining the applicable VMC minima as a function of airspace class and an altitude band in which the current or projected position is located.

13. The computer system of claim 8, wherein the warning system is a terrain awareness and warning system (TAWS) or a traffic collision avoidance system (TCAS).

14. The computer system of claim 8, wherein the operations further include:

determining that the inhibition has remained on after elapse of a predetermined length of time; and alerting that operator of the aircraft and an air traffic condition to indicate that the inhibition has not been turned off.

15. A non-transitory computer-readable medium storing instructions that, when executed by one or more processors of a computer system, cause the one or more processors to perform a method for alerting improper inhibition of alerts of aircraft warning systems, the method comprising:

determining whether an inhibition of a safety alert of a warning system of an aircraft is activated;

upon determining that the inhibition is activated, determining whether the inhibition is improper under current or upcoming operating conditions of the aircraft, the current or upcoming operating conditions including a current or projected position of the aircraft and a weather condition at the current or projected position;

upon determining that the inhibition is improper under the current or upcoming operating conditions, alerting an operator of the aircraft to deactivate the inhibition;

determining whether a deactivation of the inhibition from the operator of the aircraft is received, via interaction with one or more controls of the aircraft; and in accordance with a determination that a deactivation of the inhibition from the operator of the aircraft has not been received, after a predetermined time period transmitting an alert to an air traffic controller that the inhibition is improper and that inhibition has not been deactivated by the operator of the aircraft.

16. The non-transitory computer-readable medium of claim 14, wherein the determining whether the inhibition is improper under current or upcoming operating conditions includes:

determining a type of airspace in which the current or projected position is located;

based on the determined type of airspace, determining visual meteorological conditions (VMC) minima applicable to an operation of the aircraft at the current or projected position;

determining the weather condition at the current or projected position of the aircraft; and determining whether visual flight rules (VFR) flight is permitted for the operation of the aircraft at the current or projected position based on the determined VMC minima.

17. The non-transitory computer-readable medium of claim 15, wherein the weather condition includes a flight visibility condition and cloud conditions for the current or projected position.

18. The non-transitory computer-readable medium of claim 16, wherein the determining whether visual flight rules (VFR) flight is permitted for the operation of the aircraft at the current or projected position includes:

determining whether the flight visibility condition and the cloud conditions satisfy the determined VMC minima.

19. The non-transitory computer-readable medium of claim 15, wherein the type of airspace is a class of airspace, and the determining the applicable VMC minima includes determining the applicable VMC minima as a function of airspace class and an the altitude band in which the current or projected position is located.

20. The non-transitory computer-readable medium of claim 15, wherein the method further includes:

determining that the inhibition has remained on after elapse of a predetermined length of time; and alerting that operator of the aircraft and an air traffic condition to indicate that the inhibition has not been turned off.

* * * * *